United States Patent
Takeshima et al.

(10) Patent No.: US 8,239,901 B2
(45) Date of Patent: Aug. 7, 2012

(54) BUFFER CONTROL METHOD, RELAY APPARATUS, AND COMMUNICATION SYSTEM

(75) Inventors: Ryota Takeshima, Tokyo (JP); Hiroaki Dei, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 12/281,665

(22) PCT Filed: Mar. 9, 2007

(86) PCT No.: PCT/JP2007/054635
§ 371 (c)(1),
(2), (4) Date: Sep. 26, 2008

(87) PCT Pub. No.: WO2007/105618
PCT Pub. Date: Sep. 20, 2007

(65) Prior Publication Data
US 2009/0313676 A1    Dec. 17, 2009

(30) Foreign Application Priority Data

Mar. 14, 2006 (JP) .................... 2006-069261
Apr. 21, 2006 (JP) .................... 2006-118335

(51) Int. Cl.
*H04N 7/173* (2011.01)
(52) U.S. Cl. ........... 725/94; 725/95; 725/119; 725/120; 375/240.01
(58) Field of Classification Search .......... 725/119, 725/120, 94, 95
See application file for complete search history.

(56) References Cited

U.S. PATENT DOCUMENTS

| | | | |
|---|---|---|---|
| 5,758,194 A | 5/1998 | Kuzma | |
| 7,542,435 B2 * | 6/2009 | Leon et al. | 370/278 |
| 2003/0091000 A1 | 5/2003 | Chu et al. | |
| 2004/0190607 A1 * | 9/2004 | Wakimoto et al. | 375/240.01 |

FOREIGN PATENT DOCUMENTS

| | | | |
|---|---|---|---|
| JP | 1999032207 A | | 2/1999 |
| JP | 11-032207 | * | 2/2002 |
| JP | 2002/217969 | * | 8/2002 |
| JP | 2002217969 A | | 8/2002 |
| JP | 2004-158929 | * | 6/2004 |
| JP | 2004158929 A | | 6/2004 |
| JP | 2006013583 A | | 1/2006 |
| KR | 0152772 | * | 10/1998 |
| KR | 0152772 A | | 10/1998 |

OTHER PUBLICATIONS

H. Schulzrinne, S. Casner, R. Frederick, V. Jacobson, "RTP: A Transport Protocol for Real-Time Applications", Networking Group, RFC 3550, Jul. 2003, © The Internet Society, Internet <URL:http://www.ietf.org/rfc/rfc3550.txt>.

Telecommunication Standardization Sector of ITU, "ITU-T Recommendation H.223", Mar. 1996.

(Continued)

*Primary Examiner* — Kristine Kincaid
*Assistant Examiner* — Sumaiya A Chowdhury

(57) ABSTRACT

Disclosed is a relay apparatus including a video buffer control unit that controls a video buffer according to a control instruction received by an instruction receiving unit, a threshold set by a threshold setting unit, and a timing set by a timing generation unit. The video buffer control unit controls the video buffer for each segment, according to a result of analysis by a segment interpretation unit.

22 Claims, 7 Drawing Sheets

OTHER PUBLICATIONS

International Search Report for PCT/JP2007/054635 mailed Apr. 24, 2007.
International Preliminary Report on Patentability for PCT/JP2007/054635 issued Sep. 16, 2008.
Korean Office Action for KR10-2008-07021364 mailed Jun. 30, 2010.
Chinese Office Action for CN200780007950.5 mailed Dec. 31, 2010.
Supplementary European Search Report for EP 07 73 8120 completed Sep. 29, 2011.
J. Orozco et al., "DiffServ-Aware Streaming of H.264 Video", Institut de recherche en informatique et systemes aleatoires, No. 1627, Jun. 2004, pp. 1-29, XP002660229.

* cited by examiner

BUFFER CONTROL METHOD, RELAY APPARATUS, AND COMMUNICATION SYSTEM

TECHNICAL FIELD

The present invention relates to a buffer control method of controlling a buffer included in a relay apparatus. More specifically, the invention relates to a video buffer control method capable of minimizing disturbance in video displayed on a receiving side due to the influence of transmission line conditions when communication involving the video such as a video phone, a video conference, or the like is performed through networks having the different transmission line conditions (in terms of bandwidth, data loss, and error characteristic). Further, the present invention relates to a relay apparatus and a communication system to which the buffer control method is applied.

BACKGROUND ART

In recent years, with an increased speed of a network caused by use of an ADSL or an optical communication technology, communication of image encoded data and audio encoded data through the network, using packets, is performed. A bidirectional communication system and a conference system using so-called VoIP (Voice over IP) and TVoIP (TV over IP) have become rapidly widespread.

There are some kinds of encoding methods used for communication of such image encoded data and audio encoded data. As an encoding method of a moving picture image, for example, a lot of methods of transmitting encoded data resulting from encoding by highly efficient compression based on inter-frame prediction are used. In these encoding methods based on the inter-frame prediction, an encoded image is predicted using frames which are temporally located before and after. Then, by encoding prediction parameters and a prediction residual image obtained by prediction of the encoded image, an information amount of moving picture image data highly correlated in the time direction is reduced. Further, by performing compression encoding with high efficiency by conversion encoding or quantizing the prediction residual image data, communication through a small transmission bandwidth is allowed.

Among the third-generation cellular phones are cellular phone terminals that support provision of video phone services in the circuit switching (CS) system. Further, there is also provided a gateway that connects a cellular phone terminal that may use these video phone services and a TVoIP client connected to an IP network. Then, using these cellular phone terminals and gateways, real-time communication over a CS network (circuit switching network) and a PS network (packet switching network) has been already performed.

When real-time communication is performed between the networks having the different transmission conditions (in terms of bandwidth, data loss, and error characteristic) as described above, a relay apparatus is used for connecting (relaying) both of the networks. In this case, the relay apparatus includes a jitter buffer that absorbs jitter on the networks, or performs delay reduction processing of reducing a transmission delay when the jitter is absorbed.

As the relay apparatus that relays encoded data, Patent Document 1, for example, describes an encoded stream relay apparatus that inserts encoding information obtained from an encoded stream into the encoded stream.

Patent Document 1: JP Patent Kokai Publication No. JP-P-2006-13583A (in paragraphs 0029-0042, FIG. 6)
Non-patent Document 1: H. Schulzrinne, S. Casner, R. Frederick, V. Jacobson, "RTP: A Transport Protocol for Real-Time Applications", RFC 3550, July 2003, Internet <URL: http://www.ietf.org/rfc/rfc3550.txt>
Non-patent Document 2: TELECOMMUNICATION STANDARDIZATION SECTOR OF ITU, "ITU-T Recommendation H.223", 03/1996

DISCLOSURE OF THE INVENTION

However, in case of a video stream being subjected to the delay reduction processing, if the video stream is encoded using prediction encoding currently being widely used, image quality of the video stream to be reproduced on a receiving side will be greatly degraded by reduction processing of arbitrary data in the video stream. Further, if the video stream is encoded using the prediction encoding, there is a problem that a state of a degraded video continues for a while, and then image reproduction is performed.

Alternatively, a method of transcoding encoded data so as to absorb a difference in bandwidths between the different networks may be conceived. However, an increase in the amount of processing for transcoding the encoded data is significant. Thus, this method is not suited to a case where a lot of streams must be processed by a same device.

According to the encoded stream relay apparatus described in Patent Document 1, an encoded stream received by a receive terminal may be normally decoded, irrespective of a manner in which encoded information is transmitted. However, occurrence of disturbance in video on a receiving side due to the influence of transmission line conditions between the different networks cannot be prevented.

Accordingly, it is an object of the present invention to provide a buffer control method, a relay apparatus, and a communication system capable of reducing degradation of a video to be displayed on a receiving side due to the influence of transmission line conditions when communication involving the video is performed.

According to the present invention, there is provided a buffer control method of controlling a buffer (such as a video buffer 208) included in a relay apparatus (such as a relay apparatus 101 or 401), characterized in that the method includes:

a storage step of storing a video stream received from a transmit terminal (such as a transmit terminal 102) in the buffer of the relay apparatus; and a buffer control step of controlling a data amount of the video stream stored in the buffer of the relay apparatus for each segment (which is the unit such as a frame, a video packet, a GOB, a slice, or a NAL unit, by which, even if a part of segments cannot be decoded due to a loss or an error, decoding can be independently performed using other segment).

According to the present invention, there is provided a buffer control method of controlling a buffer included in a relay apparatus. The method may include:

a receive step of receiving a video stream transmitted from a transmit terminal;

a storage step of storing the received video stream in the buffer of the relay apparatus;

a buffer control step of controlling a data amount of the video stream stored in the buffer of the relay apparatus; and a transmit step of extracting the video stream from the buffer of the relay apparatus and transmitting to a destination receive terminal (such as a receive terminal 103) the extracted video stream.

According to the present invention, there is provided a buffer control method of controlling a buffer included in a relay apparatus. The method may include:

a receive step of receiving a video stream transmitted from a transmit terminal;

a storage step of storing the received video stream in the buffer of the relay apparatus;

a buffer control step of controlling a data amount of the video stream stored in the buffer of the relay apparatus; and a transmit step of extracting the video stream from the buffer of the relay apparatus and transmitting to a destination receive terminal the extracted video stream. In the buffer control step, decimation processing of decimating a predetermined data amount of the video stream stored in the buffer of the relay apparatus may be executed.

In the buffer control method according to the present invention, in the buffer control step, the data amount of the video stream stored in the buffer of the relay apparatus may be controlled for each segment, by discarding the video stream stored in the buffer of the relay apparatus, stopping supply of the video stream to the buffer of the relay apparatus, or increasing an output rate of the video stream to be output from the buffer of the relay apparatus.

In the buffer control method according to the present invention, in the buffer control step, the data amount of the video stream stored in the buffer of the relay apparatus may be controlled by using at least one of the frame, video packet, GOB, slice and NAL unit as a predetermined unit.

In the buffer control method according to the present invention, there may be included a threshold setting step of setting a threshold by a predetermined method. Then, in the buffer control step, the data amount of the video stream stored in the buffer of the relay apparatus may be controlled based on the set threshold.

In the buffer control method according to the present invention, in the buffer control step, the data amount of the video stream stored in the buffer of the relay apparatus may be controlled using, as buffer control based on the threshold, at least one control of:

(A) control of setting an upper limit value of the data amount of the video stream as the threshold and stopping supply of the video stream to the buffer of the relay apparatus, discarding at least a portion of the video stream in the buffer of the relay apparatus, or increasing an output bit rate of the video stream from the buffer of the relay apparatus, if the data amount of the video stream stored up in the buffer of the relay apparatus has reached the upper limit value or higher;

(B) control of setting the upper limit value and a lower limit value of the data amount of the video stream as the thresholds, and stopping supply of the video stream to the buffer of the relay apparatus or increasing the output bit rate of the video stream from the buffer of the relay apparatus until the data amount of the video stream in the buffer of the relay apparatus reaches the lower limit value, if the data amount of the video stream stored up in the buffer of the relay apparatus has reached the upper limit value or higher; and (C) control of setting a decimation threshold for decimating the data amount of the video stream as the threshold and not supplying a predetermined data amount of data to the buffer of the relay apparatus, if the data amount of the video stream in the buffer of the relay apparatus has reached the decimation threshold.

In the buffer control method according to the present invention, in the buffer control step, the data amount of the video stream stored in the buffer of the relay apparatus may be controlled based on a predetermined timing.

In the buffer control method according to the present invention, in the buffer control step, the data amount of the video stream stored in the buffer of the relay apparatus may be controlled based on the predetermined timing including at least one of:

a timing of each certain time;

a timing when the number of received packets has reached a certain amount;

a timing when a data amount of the received video stream has reached a certain amount;

a timing when a data amount supplied to the video buffer has reached a certain amount; and a timing when the number of received segments has reached a certain amount.

In the buffer control method according to the present invention, in the buffer control step, the data amount of the video stream stored in the buffer of the relay apparatus may be controlled according to a control instruction received from an external apparatus (such as an external apparatus 104).

In the buffer control method according to the present invention, there may be included a frame type determination step of determining a frame type of a frame included in the video stream. In the buffer control step, the data amount of the video stream stored in the buffer of the relay apparatus may be controlled using the frame type determined in the frame type determination step.

In the buffer control method according to the present invention, there may be included a referenced frame determination step of determining whether the frame is a referenced frame referenced from other frame or not, based on the frame type. Then, in the buffer control step, as buffer control using the frame type, the data amount of the video stream stored in the buffer of the relay apparatus may be controlled, using a result of determination as to whether the frame is the referenced frame or not.

In the buffer control method according to the present invention, there may be included a step of setting a priority of the frame according to a distance from the referenced frame. Then, in the buffer control step, as the buffer control using the frame type, the data amount of the video stream stored in the buffer of the relay apparatus may be controlled, using the priority of the frame.

In the buffer control method according to the present invention, there may be included a slice type determination step of determining a slice type of a slice included in the video stream. In the buffer control step, the data amount of the video stream stored in the buffer of the relay apparatus may be controlled using the determined slice type.

In the buffer control method according to the present invention, there may be included a type determination step of determining a type of a NAL unit included in the video stream. In the buffer control step, the data amount of the video stream stored in the buffer of the relay apparatus may be controlled using the determined NAL unit type.

In the buffer control method according to the present invention, there may be included a referenced unit determination step of determining whether the NAL unit included in the video stream is a referenced unit referenced by other NAL unit included in the video stream or not. Then, in the buffer control step, the data amount of the video stream stored in the buffer of the relay apparatus may be controlled, using a result of determination as to whether the NAL unit is the referenced unit or not.

In the buffer control method according to the present invention, there may be included a step of determining a macroblock type of a macroblock included in the video stream. In the buffer control step, the data amount of the video stream stored in the buffer of the relay apparatus may be controlled using the determined macroblock type.

According to the present invention, there is provided a relay apparatus that relays communication of a video stream. The relay apparatus includes:

storage control means (implemented by a received data separating unit 202, for example) for storing the video stream received from a transmit terminal in a buffer (such as the video buffer 208) of the relay apparatus; and buffer control means (implemented by a video buffer control unit 207 or 407, for example) for controlling a data amount of the video stream stored in the buffer of the relay apparatus for each segment.

According to the present invention, there is provided a relay apparatus that relays communication of a video stream. The relay apparatus may include:

receiving means (implemented by a receiving unit 201, for example) for receiving the video stream from the transmit terminal;

the storage control means (implemented by the received data separating unit 202, for example) for storing the video stream received by the receiving means in the buffer (such as the video buffer 208) of the relay apparatus;

the buffer control means (implemented by the video buffer control unit 207 or 407, for example) for controlling the data amount of the video stream stored in the buffer of the relay apparatus;

extraction means (implemented by a transmit data generation unit 209, for example) for extracting the video stream from the buffer of the relay apparatus; and transmitting means (implemented by a transmitting unit 210, for example) for transmitting to a destination receive terminal the extracted video stream extracted by the extraction means.

According to the present invention, there is provided a relay apparatus that relays communication of a video stream. The relay apparatus may include:

the receiving means for receiving the video stream from the transmit terminal;

the storage control means for storing the video stream received by the receiving means in the buffer of the relay apparatus;

the buffer control means for controlling the data amount of the video stream stored in the buffer of the relay apparatus;

the extraction means for extracting the video stream from the buffer of the relay apparatus; and the transmitting means for transmitting to the destination receive terminal the video stream extracted by the extraction means. The buffer control means may include decimation means (implemented by the video buffer control unit 207 or 407, for example) for executing decimation processing of decimating a predetermined data amount of the video stream stored in the buffer of the relay apparatus.

In the relay apparatus according to the present invention, the buffer control means may control the data amount of the video stream stored in the buffer of the relay apparatus for each segment, by discarding the video stream stored in the buffer of the relay apparatus, stopping supply of the video stream to the buffer of the relay apparatus, or increasing an output rate of the video stream to be output from the buffer of the relay apparatus.

In the relay apparatus according to the present invention, the buffer control means may control the data amount of the video stream stored in the buffer of the relay apparatus, by using at least one of a frame, a video packet, a GOB, a slice and a NAL unit as a predetermined unit.

In the relay apparatus according to the present invention, there may be included threshold setting means (implemented by a threshold setting unit 204, for example) for setting a threshold by a predetermined method. Then, the buffer control means may control the data amount of the video stream stored in the buffer of the relay apparatus based on the threshold set by the threshold setting means.

In the relay apparatus according to the present invention, the buffer control means may control the data amount of the video stream stored in the buffer of the relay apparatus, using, as buffer control based on the threshold, at least one of:

(A) control of setting an upper limit value of the data amount of the video stream as the threshold and stopping supply of the video stream to the buffer of the relay apparatus, discarding at least a portion of the video stream in the buffer of the relay apparatus, or increasing an output bit rate of the video stream from the buffer of the relay apparatus, if the data amount of the video stream stored up in the buffer of the relay apparatus has reached the upper limit value or higher;

(B) control of setting the upper limit value and a lower limit value of the data amount of the video stream as the thresholds, and stopping supply of the video stream to the buffer of the relay apparatus or increasing the output bit rate of the video stream from the buffer of the relay apparatus until the data amount of the video stream in the buffer of the relay apparatus reaches the lower limit value, if the data amount of the video stream stored up in the buffer of the relay apparatus has reached the upper limit value or higher; and (C) control of setting a decimation threshold for decimating the data amount of the video stream as the threshold and not supplying a predetermined data amount of data to the buffer of the relay apparatus, if the data amount of the video stream in the buffer of the relay apparatus has reached the decimation threshold.

In the relay apparatus according to the present invention, the buffer control means may control the data amount of the video stream stored in the buffer of the relay apparatus based on a predetermined timing.

In the relay apparatus according to the present invention, the buffer control means may control the data amount of the video stream stored in the buffer of the relay apparatus based on the predetermined timing including at least one of:

a timing of each certain time;

a timing when the number of received packets has reached a certain amount;

a timing when a data amount of the received video stream has reached a certain amount;

a timing when a data amount supplied to the video buffer has reached a certain amount; and a timing when the number of received segments has reached a certain a mount.

In the relay apparatus according to the present invention, the buffer control means may control the data amount of the video stream stored in the buffer of the relay apparatus according to a control instruction received from an external apparatus.

In the relay apparatus according to the present invention, there may be included frame type determination means (implemented by a segment interpretation unit 206, for example) for determining a frame type of a frame included in the video stream. The buffer control means may control the data amount of the video stream stored in the buffer of the relay apparatus using the frame type determined by the frame type determination means.

In the relay apparatus according to the present invention, there may be included referenced/unreferenced determination means (implemented by a stream interpretation unit 406, for example) for determining whether the frame is a referenced frame referenced from other frame or not, based on the frame type. Then, as buffer control using the frame type, the buffer control means may control the data amount of the video stream stored in the buffer of the relay apparatus, using a result of determination as to whether the frame is the referenced frame or not.

In the relay apparatus according to the present invention, there may be included priority setting means (implemented by the stream interpretation unit 406, for example) for setting a priority of the frame according to a distance from the referenced frame. Then, as the buffer control using the frame type, the buffer control means may control the data amount of the video stream stored in the buffer of the relay apparatus, using the priority of the frame.

In the relay apparatus according to the present invention, there may be included slice type determination means (implemented by the segment interpretation unit 206, for example) for determining a slice type of a slice included in the video stream. The buffer control means may control the data amount of the video stream stored in the buffer of the relay apparatus using the slice type determined by the slice type determination means.

In the relay apparatus according to the present invention, there may be included type determination means (implemented by the segment interpretation unit 206, for example) for determining a type of a NAL unit included in the video stream. The buffer control means may control the data amount of the video stream stored in the buffer of the relay apparatus using the NAL unit type determined by the type determination means.

In the relay apparatus according to the present invention, there may be included referenced/unreferenced determination means (implemented by the segment interpretation unit 206, for example) for determining whether the NAL unit included in the video stream is a referenced unit referenced by other NAL unit included in the video stream or not. Then, the buffer control means may control the data amount of the video stream stored in the buffer of the relay apparatus, using a result of determination by the referenced/unreferenced determination means as to whether the NAL unit is the referenced unit or not.

In the relay apparatus according to the present invention, there may be included macroblock type determination means (implemented by the segment interpretation unit 206, for example) for determining a macroblock type of a macroblock included in the video stream. The buffer control means may control the data amount of the video stream stored in the buffer of the relay apparatus using the macroblock type determined by the macroblock type determination means.

According to the present invention, there is provided a communication system that performs communication of a video stream, and includes a relay apparatus that relays communication of the video stream. The relay apparatus includes:

storage control means for storing the video stream received from a transmit terminal in a buffer of the relay apparatus; and buffer control means for controlling a data amount of the video stream stored in the buffer of the relay apparatus for each segment.

According to the present invention, there is provided a communication system that performs communication of a video stream, and includes a relay apparatus that relays communication of the video stream. The relay apparatus may include:

receiving means for receiving the video stream from a transmit terminal;

storage control means for storing the video stream received by the receiving means in a buffer of the relay apparatus;

buffer control means for controlling a data amount of the video stream stored in the buffer of the relay apparatus;

extraction means for extracting the video stream from the buffer of the relay apparatus; and transmitting means for transmitting to a destination receive terminal the video stream extracted by the extraction means.

According to the present invention, there is provided a buffer control program for controlling a buffer included in a relay apparatus. The buffer program causes a computer to execute processing of:

storing a video stream received from a transmit terminal in the buffer of the relay apparatus; and controlling a data amount of the video stream stored in the buffer of the relay apparatus for each segment.

According to the present invention, there is provided a buffer control program for controlling a buffer included in a relay apparatus. The buffer program may cause a computer to execute processing of:

receiving a video stream from a transmit terminal;

storing the received video stream in the buffer of the relay apparatus;

controlling a data amount of the video stream stored in the buffer of the relay apparatus for each segment; and extracting the video stream from the buffer of the relay apparatus and transmitting the extracted video stream to a destination receive terminal.

According to the present invention, a video stream received from the transmit terminal is stored in a buffer of a relay apparatus. Further, the amount of data of the video stream stored in the buffer of the relay apparatus is controlled for each segment. Since buffer control is performed for each segment, when the relay apparatus discards (reduces) a portion of the video stream that would have been originally transmitted, image quality degradation at the time of reproduction of a video based on the video stream received by the receive terminal can be relinquished. Accordingly, when communication involving a video is performed, degradation of the video to be displayed on a receiving side due to the influence of transmission line conditions can be reduced.

Further, according to the present invention, the buffer control is performed for each segment. Thus, even when communication of a video stream is performed through networks having different transmission line conditions, degradation of a video to be displayed on a receiving side due to the influence of transmission line conditions can be reduced, without transcoding encoded data.

PREFERRED MODES OF THE INVENTION

First Exemplary Embodiment

A first exemplary embodiment of the present invention will be described below with reference to drawings. A video buffer control method (buffer control method) according to the present invention is applied to a relay apparatus that relays a video stream transmitted from a terminal. Further, the buffer control method is applied to a communication system that relays communication through different networks using the relay apparatus.

The relay apparatus in this exemplary embodiment that relays the video stream transmitted from the terminal includes means for receiving the video stream transmitted from the terminal, means for storing the received video stream in a video buffer, and means for controlling the amount of data in the buffer.

The relay apparatus may include means for controlling the amount of data in the buffer for each predetermined unit. In this case, the relay apparatus may include means for using at least one of segments specific to the video stream, such as (1) a frame, (2) a video packet, (3) a GOB (Group Of Blocks), (4) a slice, or (5) an NAL (Network Abstraction Layer) unit, as the predetermined unit.

Further, the relay apparatus may include means for setting a threshold using a predetermined method and means for controlling the amount of data in the buffer based on the set threshold. Alternatively, the relay apparatus may include means for controlling the amount of data in the buffer based on a predetermined timing. Alternatively, the relay apparatus may include means for controlling the amount of data in the buffer according to an instruction from an external apparatus. Then, the relay apparatus extracts the video stream from the video buffer and transmits the extracted video stream to a relay destination terminal.

Figure 1:
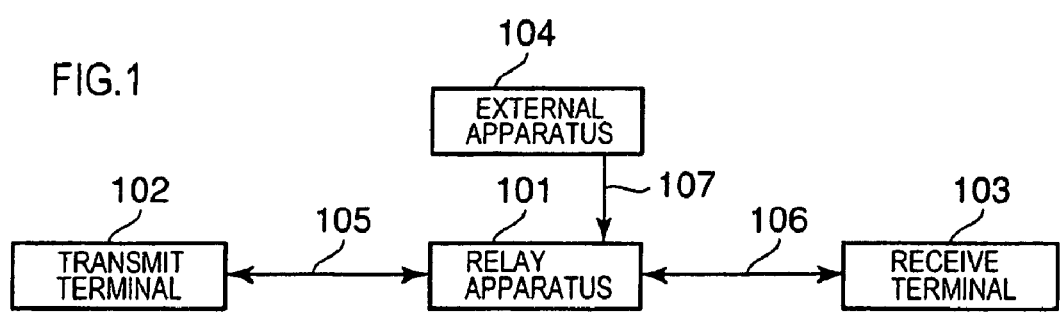
FIG. 1 is a block diagram showing an example of a configuration of a communication system that uses a buffer control method.

A configuration of the communication system that uses the buffer control method will be described with reference to drawings. FIG. 1 is a block diagram showing an example of the configuration of the communication system that uses the buffer control method. As shown in FIG. 1, the communication system includes a relay apparatus 101, a transmit terminal 102 that transmits a video stream, a receive terminal 103 that receives the video stream transmitted from the transmit terminal 102, and an external apparatus 104 that transmits a video queue control instruction.

As shown in FIG. 1, the relay apparatus 101 and the transmit terminal 102 are connected through a transmission line 105. The relay apparatus 101 and the receive terminal 103 are connected through a transmission line 106. The relay apparatus 101 and the external apparatus 104 are connected through a transmission line 107. Each of the transmission lines 105 to 107 is implemented by a network that uses a wired or wireless IP (Internet Protocol) or a circuit switching network.

In this exemplary embodiment, the transmit terminal 102 and the receive terminal 103 are respectively connected to networks with different transmission line conditions (in terms of bandwidth, data loss, and error characteristic). In the example shown in FIG. 1, for example, bandwidths, data losses, and error characteristics of the transmission lines 105 and 106 are different.

FIG. 1 shows a case where one transmit terminal 102 is used. The communication system may include a plurality of the transmit terminals 102. FIG. 1 shows a case where one receive terminal 103 is used. The communication system may include a plurality of the receive terminals 103. The transmit terminal 102 may include a function of receiving a video stream as well as transmitting the video stream. The receive terminal 103 may include a function of transmitting a video stream as well as receiving the video stream. Further, the external apparatus 104 may be implemented by the same device as the transmit terminal 102 or the receive terminal 103.

Specifically, the transmit terminal 102 is implemented by an information processing terminal such as a cellular phone or a PDA. Alternatively, the transmit terminal 102 may be a terminal for a personal computer or the like. The transmit terminal 102 includes a function of transmitting a video stream through the transmission line 105. When a video phone call is made or a video conference is held, for example, the transmit terminal 102 transmits data including a video stream through the transmission line 105 according to an operation by a user, for example.

Specifically, the receive terminal 103 is implemented by an information processing terminal such as a cellular phone or PDA. Alternatively, the receive terminal 103 may be the terminal for a personal computer or the like. The receive terminal 103 includes a function of receiving a video stream through the transmission line 106. Further, the receive terminal 103 includes a function of displaying a video on a display portion such as a liquid crystal display portion, based on the received video stream. When the video phone call is made or the video conference is held, for example, the receive terminal 103 receives the data including the video stream through the transmission line 106 according to an operation by the user and reproduces a video on the liquid crystal display portion.

Specifically, the external apparatus 104 is implemented by an information processing device such as a workstation or a personal computer. The external apparatus 104 is operated by a communication carrier or a provider that manages the relay apparatus 101, for example. The external apparatus 104 includes a function of transmitting a control instruction for controlling the buffer included in the relay apparatus 101 to the relay apparatus 101 through the transmission line 107. When the external apparatus 104 is implemented by the same device as the transmit terminal 102 or the receive terminal 103 (such as a user terminal), the external apparatus 104 may be the terminal such as the cellular phone or the PDA.

Figure 2:
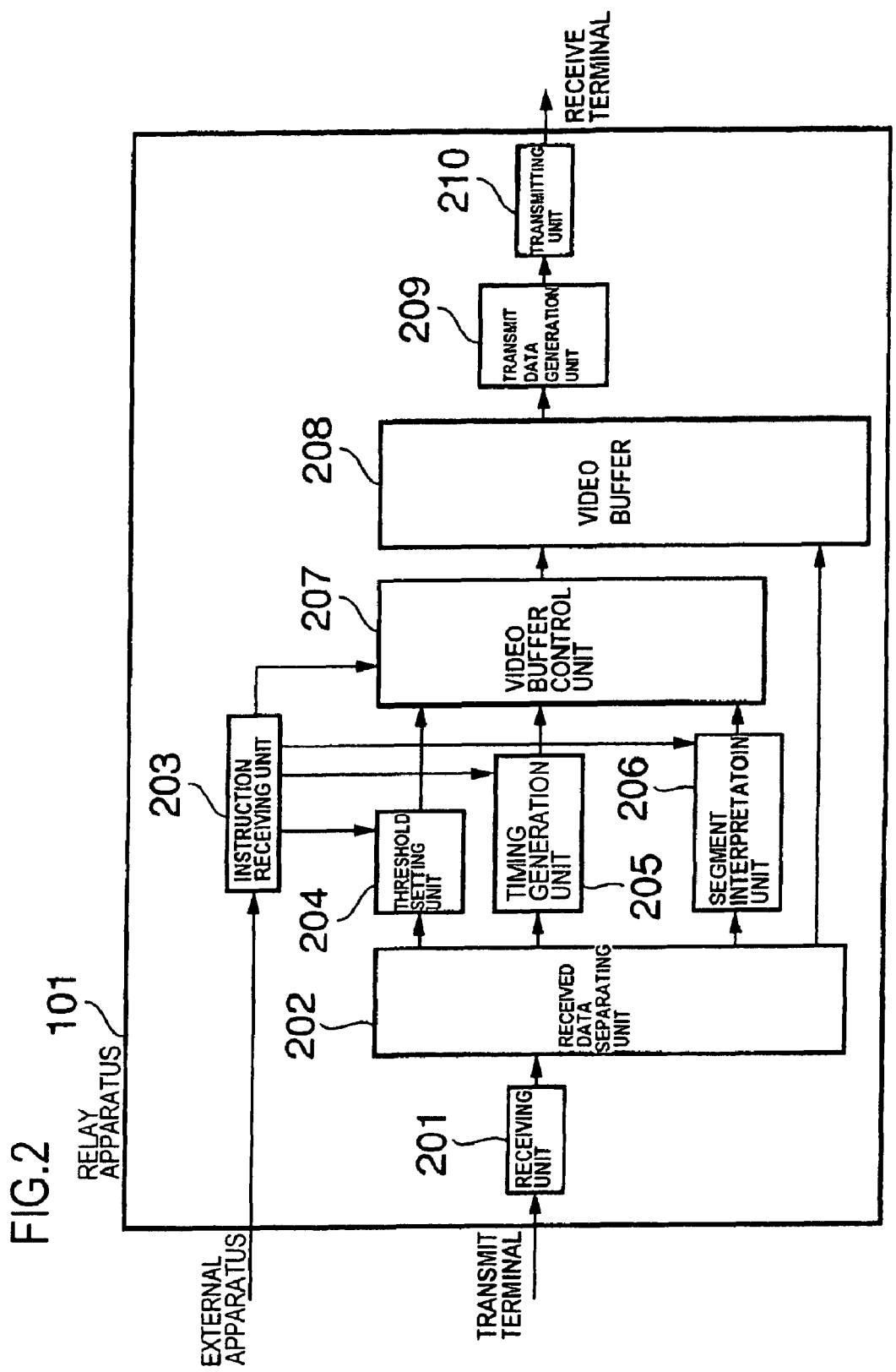
FIG. 2 is a block diagram showing an example of a configuration of a relay apparatus.

Specifically, the relay apparatus 101 is implemented by a communication control device such as a gateway. Alternatively, the relay apparatus 101 may be the information processing device such as the workstation or the personal computer that executes processing according to a communication relay program for relaying communication. FIG. 2 is a block diagram showing an example of a configuration of the relay apparatus. As shown in FIG. 2, the relay apparatus 101 includes a receiving unit 201, a received data separating unit 202, an instruction receiving unit 203, a threshold setting unit 204, a timing generation unit 205, a segment interpretation unit 206, a video buffer control unit 207, a video buffer 208, a transmit data generation unit 209, and a transmitting unit 210.

The receiving unit 201 includes a function of receiving from the transmit terminal 102 data including a video stream through the transmission line 105. The received data separating unit 202 includes a function of separating the video stream from the received data and extracting the video stream. The received data separating unit 202 includes a function of storing the separated video stream in the video buffer 208.

The instruction receiving unit 203 includes a function of receiving the instruction from the external apparatus 104 through the transmission line 107. The threshold setting unit 204 includes a function of setting a threshold used for buffer control. The timing generation unit 205 includes a function of setting the timing for the buffer control and generating timing information. The segment interpretation unit 206 includes a function of receiving the video stream from the received data separating unit 202 and interpreting (analyzing) each segment in the video stream.

The video buffer control unit 207 includes a function of performing control over the video buffer 208. In this exemplary embodiment, the video buffer control unit 207 performs processing such as deleting a video stream stored in the video buffer 208, thereby performing control over the video buffer 208. In this case, the video buffer control unit 207 performs control over the video buffer 208, based on the control instruction the instruction receiving unit 203 has received from the external apparatus 104. Alternatively, the video buffer control unit 207 performs control over the video buffer 208, based on the threshold set by the threshold setting unit 204. Alternatively, the video buffer control unit 207 performs control over the video buffer 208, based on the timing set by the timing generation unit 205. Further, the video buffer control unit 207 performs control over the video buffer 208, based on a result of the analysis by the segment interpretation unit 206.

The video buffer 208 includes a function of storing the video stream resulting from separation by the received data separating unit 202. The transmit data generation unit 209 includes a function of generating transmit data of a format capable of being communicated using the transmission line 106, based on the video stream in the video buffer 208. The transmitting unit 210 includes a function of transmitting the transmit data generated by the transmit data generation unit 209 to the receive terminal 103 through the transmission line 106.

The format of the data received by the receiving unit 201 is assumed to be a transmission format that depends on a communication protocol used in the transmission line 105. The format of the data transmitted by the transmitting unit 210 is assumed to be a transmission format that depends on a communication protocol used in the transmission line 106. The transmission format herein denotes the format such as the RTP format in the IP network or the H.223 format in the circuit switching network, which is used when a video stream is transmitted.

The RTP format described above is described in Nonpatent Document 1 of "H. Schulzrinne, S. Casner, R. Frederick, V. Jacobson, "RTP: A Transport Protocol for Real-Time Applications", RFC 3550, July 2003, Internet <URL: http://www.ietf.org/rfc/rfc3550.txt>," for example.

The H.223 format described above is described in Non-patent Document 2 of "TELECOMMUNICATION STANDARDIZATION SECTOR OF ITU, "ITU-T Recommendation H.223", 03/1996", for example.

When the relay apparatus 101 is implemented by the information processing device, a storage of the relay apparatus 101 stores various programs for relaying communication of a video stream through different networks. The storage of the relay apparatus 101 stores a buffer control program for causing the computer to implement processing of storing a video stream received from the transmit terminal in the buffer of the relay apparatus and processing of controlling a data amount in the video stream stored in the buffer of the relay apparatus for each segment.

Figure 3:
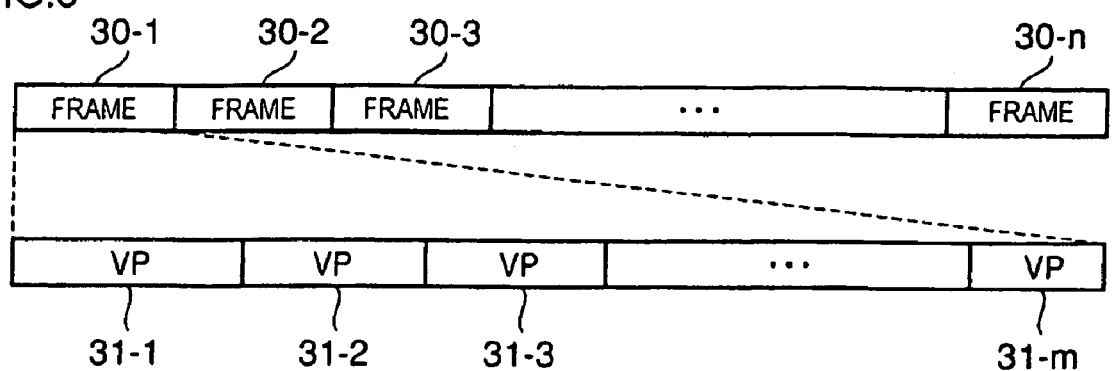
FIG. 3 is an explanatory diagram showing an example of a format for a video stream relayed by the relay apparatus.

Next, a format for the video stream relayed by the relay apparatus 101 will be described. FIG. 3 is an explanatory diagram showing an example of the format for the video stream relayed by the relay apparatus 101. As shown in FIG. 3, the video stream is assumed to be formed of a plurality of frames 30-1 to 30-n. Referring to FIG. 3, VP indicates a MPEG4 video packet. As shown in FIG. 3, the frame 30-1 is formed of a plurality of video packets VP 31-1 to 31-m. The frame 30-1 is not limited to the configuration formed of the video packets VP 31-1 to 31-m, and may be the one that is not partitioned for each video packet VP. Like the frame 30-1, each of the frames 30-2 to 30-n may be formed of a plurality of the video packets VP or may be the one that is not partitioned for each video packet VP.

In this exemplary embodiment, a description is directed to a case where the video stream encoded by the MPEG4 system is communicated. The buffer control method is not limited to a specific encoding system, and may be applied to a communication system that performs communication of a video stream encoded using the MPEG1 system, MPEG2 system, or the like, for example. Frames included in the video stream are not limited to the ones partitioned for each video packet VP, and may be partitioned for each unit specific to the video encoding system, such as the GOB in the H.263 system, or the slice, for example. Alternatively, each frame may be partitioned for each unit specific to the video encoding system, such as the NAL unit in the H.264 system, or the slice, for example.

Figure 4:
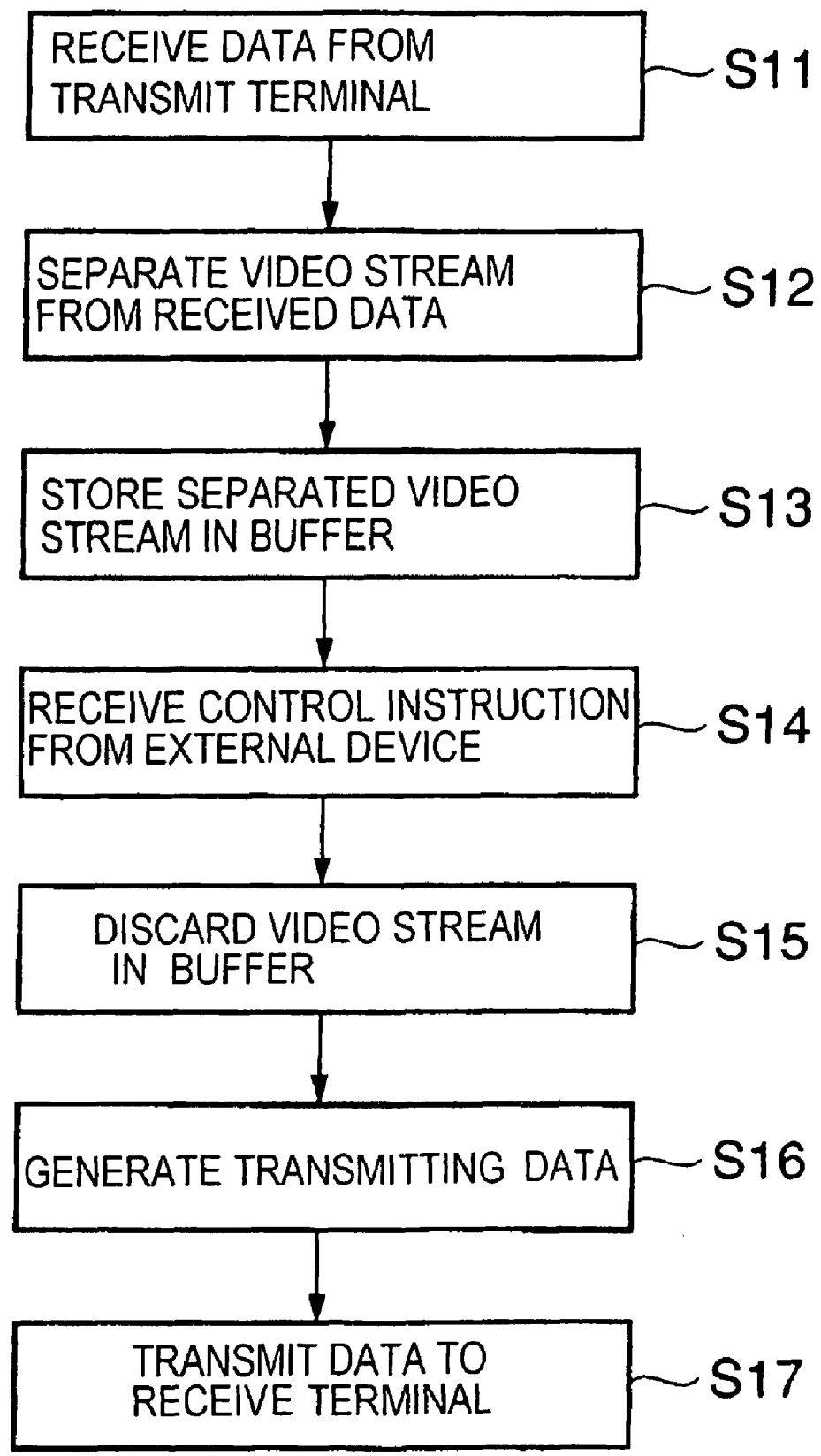
FIG. 4 is a flowchart showing an example of buffer control processing by which the relay apparatus controls a video buffer.

Next an operation will be described. FIG. 4 is a flowchart showing an example of buffer control processing of controlling the video buffer 208 by the relay apparatus 101. When the user of the transmit terminal 102 makes a video phone call to or holds a video conference with the user of the receive terminal 103, the user of the transmit terminal 102 operates the transmit terminal 102, thereby performing the operation of instructing transmission of a video stream. The transmit terminal 102 transmits data including the video stream to the relay apparatus 101 through the transmission line 105, according to the operation by the user.

First, an operation of receiving the video stream and storing the received video stream in the video buffer 208 by the relay apparatus 101 will be described. The receiving unit 201 of the relay apparatus 101 receives receive data including at least a video stream from the transmit terminal 102 through the transmission line 105 (in step S11). Then, the received data separating unit 202 separates the video stream from the receive data based on the transmission format used in the transmission line 105, thereby extracting the video stream (in step S12). Further, the received data separating unit 202 stores the separated video stream in the video buffer 208 (in step S13). By the processing described above, the video stream is stored in the video buffer 208 of the relay apparatus 101 one by one.

Next, an operation of controlling the video buffer 208 by the relay apparatus 101 will be described. The instruction receiving unit 203 of the relay apparatus 101 receives the control instruction from the external apparatus 104 at a predetermined timing through the transmission line 107 (in step S14). Then, the video buffer control unit 207 discards (deletes) the video stream stored in the video buffer 208 according to the control instruction received by the instruction receiving unit 203 (in step S15).

In this exemplary embodiment, the threshold setting unit 204 of the relay apparatus 101 sets the predetermined threshold in advance. In this case, the video buffer control unit 207 discards (deletes) the video stream stored in the video buffer 208 according to the threshold set by the threshold setting unit 204, in step S15.

In this exemplary embodiment, the timing generation unit 205 of the relay apparatus 101 sets the predetermined timing in advance. In this case, the video buffer control unit 207 discards (deletes) the video stream stored in the video buffer 208 according to the timing set by the timing generation unit 205, in step S15.

In this exemplary embodiment, the segment interpretation unit 206 of the relay apparatus 101 analyses each segment included in a video stream when the segment interpretation unit 206 receives the video stream. In this case, the video buffer control unit 207 discards (deletes) the video stream in the video buffer 208 on segment-by-segment basis, based on the segment analyzed by the segment interpretation unit 206.

The video buffer control unit 207 may control the video buffer 208 based on one or a plurality of the control instruction from the external apparatus 104, threshold, timing, and the result of analysis of the segment, rather than controlling the video buffer 208 based on all of the control instruction from the external apparatus 104, threshold, timing, and the result of analysis of the segment. In this case, the relay apparatus 101 does not need to include the instruction receiving unit 203, and the communication system does not need to include the external apparatus 104 that transmits the control instruction, for example. Alternatively, the relay apparatus 101 does not need to include the threshold setting unit 204, for example. Alternatively, the relay apparatus 101 does not need to include the timing generation unit 205, for example.

The video buffer control unit 207 may discard a part or all of the video stream stored in the video buffer 208.

Next, an operation of transmitting the video stream stored in the video buffer 208 by the relay apparatus 101 will be described. The transmit data generation unit 209 of the relay apparatus 101 processes the video stream (that has remained in the video buffer 208 without being discarded in step S15) stored in the video buffer 208 into the transmission format used in the transmission line 106 and generates transmit data (in step S16). Then, the transmitting unit 210 transmits the transmit data generated by the transmit data generation unit 209 to the receive terminal 103 through the transmission line 106 (in step S17). The receive terminal 103 displays a video on the display portion, based on the video stream included in the data received from the relay apparatus 101.

Specifically, processing of storing the video stream in the video buffer 208 and discarding data in the video buffer 208 may be implemented by stopping supply to the video buffer 208 or increasing an output bit rate at which the data is output from the video buffer 208.

Next, the control instruction to be transmitted from the external apparatus 104 will be described. The control instruction to be transmitted from the external apparatus 104 is transmitted from the external apparatus 104 to the relay apparatus 101 when the video buffer 208 in the relay apparatus 101 is desired to be operated externally. Then, the control instruction is transferred to each module of the threshold setting unit 204, timing generation unit 205, segment interpretation unit 206, and video buffer control unit 207 in the relay apparatus 101 through the instruction receiving unit 203.

When the transmit terminal 102 has been switched to other transmit terminal in the communication system, for example, the control instruction for clearing (deleting the video stream from) the video buffer 208 is transmitted from the external apparatus 104 so that the video stream in the past from the transmit terminal 102 before the switching is not transmitted. Then, the control instruction is sent to the video buffer control unit 207 through the instruction receiving unit 203. Alternatively, when the receive terminal 103 has been switched to other receive terminal in the communication system due to transfer, for example, the control instruction for deleting the video stream from the video buffer 208 is transmitted from the external apparatus 104.

Alternatively, when the bit rate or the frame rate of the video stream transmitted from the transmit terminal 102 changes abruptly or has already changed, the control instruction for increasing or reducing the size of the video buffer according to the change in the bit rate or the frame rate of the video stream may be transmitted from the external apparatus 104. Then, the control instruction may be sent to the video buffer control unit 207 through the instruction receiving unit 203. Alternatively, the control instruction for changing the threshold in accordance with the change in the bit rate or the frame rate of the video stream may be sent to the threshold setting unit 204. Alternatively, the control instruction for changing the buffer control timing in accordance with the change in the bit rate or the frame rate of the video stream may be sent to the timing generation unit 205. Alternatively, the control instruction for controlling and changing the segments in accordance with the change in the bit rate or the frame rate of the bit stream may be sent to the segment interpretation unit 206. These four control instructions may be transmitted independently, or a plurality of the control instructions may be issued simultaneously.

Alternatively, when the video stream to be transmitted from the transmit terminal 102 has changed from the stream encoded by the MPEG4 system to the stream encoded by the H.263 system, the control instruction for clearing (deleting) the video stream in the video buffer 208 may be sent to the video buffer control unit 207. Then, the control instruction may be transferred to the segment interpretation unit 206 so that segment interpretation (analysis) in accordance with the changed video stream is made. The same operation is performed also when the video stream is changed to the one encoded by the system other than the MPEG4 system and the H.263 system.

Next, the threshold to be set by the threshold setting unit 204 will be described. The threshold setting unit 204 may set the threshold according to set content of a setting file stored in the storage such as a memory in advance. Alternatively, the threshold setting unit 204 may set the threshold according to setting information supplied from a predetermined setting terminal (such as the terminal for the personal computer) connected to the relay apparatus 101.

The threshold setting unit 204 sets the upper limit value of the data amount of the video stream to be pooled (may be stored up) in the video buffer 208, for example, as the threshold. In this case, when the video buffer control unit 207 determines that the amount of the video stream exceeding the upper limit value has been pooled in the buffer 208, the video buffer control unit 207 causes a part or all of the video stream in the video buffer 208 to be discarded (deleted). Alternatively, the video buffer control unit 207 stops supply of the video stream to the video buffer 208 or increases the rate of bits output from the video buffer 208.

Alternatively, the threshold setting unit 204 may set the two upper and lower limit values of the data amount of the video stream to be pooled in the video buffer 208 as the thresholds. In this case, when the video buffer control unit 207 determines that the amount of the video stream exceeding the upper limit value has been pooled in the buffer 208, the video buffer control unit 207 executes control so that supply of the video stream to the video buffer 208 is not performed until the data amount of the video stream stored up in the video buffer 208 reaches the lower limit value. Alternatively, the video buffer control unit 207 may control the rate of bits of the video stream output from the video buffer 208 to increase until the data amount of the video stream stored up in the video buffer 208 reaches the lower limit value.

The threshold setting unit 204 may originally calculate the input bit rate or the frame rate of the video stream, or obtain the input bit rate or the frame rate by receiving from the external apparatus 104 through the instruction receiving unit 203. In this case, when the obtained bit rate or the obtained frame rate is instantaneously high, the threshold setting unit 204 may temporarily increase the upper limit value of the video stream to be stored up in the video buffer 208.

Further, when the video stream is supplied to the video buffer 208, the threshold setting unit 204 may calculate the data amount of the video stream supplied to the video buffer 208 for a predetermined time (in terms of minutes, seconds, or milliseconds) or the differentiation value of the data amount. Then, the threshold setting unit 204 sets a value for making comparison with the obtained data amount or the obtained differentiation value, as the threshold. In this case, when the differentiation value of the input bit rate is large, for example, the threshold setting unit 204 may increase the upper limit value of the video buffer 208. Alternatively, control for stopping supply of the video stream before the buffered amount reaches the upper limit value may be performed so as to prevent data from overflowing from the video buffer 208.

A decimation threshold for decimating data in the video buffer 208, for example, may be provided. Then, when the buffered amount has reached the decimation threshold, buffer control (such as not performing data supply of a predetermined data amount to the video buffer 208) may be exercised over the predetermined data amount. In other words, the video buffer control unit 207 may execute decimation processing of decimating the predetermined data amount of the video stream stored in the video buffer 208. Alternatively, a plurality of the decimation thresholds may be provided. For example, the buffer control over the data amount of one frame may be performed at a point of one third of the buffered amount (or when the buffered amount has reached a first threshold) and the buffer control over the data amount of two frames may be performed at a point of two thirds of the buffered amount (or when the buffered amount has reached a second threshold).

Next, an operation of setting the predetermined timing (hereinafter referred to as a buffer control timing) and generating the timing information by the timing generation unit 205 will be described. The "buffer control timing" is the timing for checking inside the video buffer 208 (or checking the video stream stored in the video buffer 208) and exercising the buffer control by the video buffer control unit 207.

The timing generation unit 205 may set the buffer control timing according to the set content of the setting file stored in the storage such as the memory, in advance. Alternatively, the timing generation unit 205 may set a certain timing as the buffer control timing, according to the setting information supplied from the predetermined setting terminal connected to the relay apparatus 101.

Alternatively, the timing generation unit 205 may set a timing at which the receiving unit 201 has received data, as the buffer control timing. Alternatively, the timing generation unit 205 may set a timing at which the timing generation unit 205 has received the control information from the instruction receiving unit 203, as the buffer control timing.

The timing generation unit 205 may set the buffer control timing to be delayed when the data amount of the video stream from the received data separating unit 202 is smaller than the amount of data to be stored up in the video buffer 208 or the number of frequencies of reception of video streams is low. On the contrary, the timing generation unit 205 may set the buffer control timing to be advanced when the data amount of the video stream from the received data separating unit 202 is larger than the amount of data to be stored up in the video buffer 208 or the number of frequencies of reception of video streams is high. The timing may be herein a timing based on time information such as each certain time, a timing when the number of received packets has reached a certain amount, a timing when an amount of data of the received video stream has reached a certain amount, or a timing when an amount of data supplied to the video buffer has reached a certain amount. Alternatively, a timing when the number of received frames has reached a certain amount, or a timing when the number of segments specific to the received video encoding system has reached a certain amount, in conjunction with the segment interpretation unit 206 that will be shown next.

Next, segment interpretation (processing of analyzing each segment included in a video stream) to be performed by the segment interpretation unit 206 will be described. In this exemplary embodiment, as the segment targeted for analysis, two types of units are supposed: a frame and a unit specific to the video encoding system obtained by further division of the frame (such as the video packet, GOB, slice, or NAL unit). In this case, the segment interpretation unit 206 performs segment analysis processing, thereby specifies whether a video stream may be partitioned for each frame or whether the video stream may be partitioned for each unit specific to the video encoding system, for example.

In this exemplary embodiment, the unit specific to the video encoding system as the segment is obtained by dividing the frame, and is the unit by which, even if a part of the segments in a video stream cannot be decoded due to a packet loss or a bit error, decoding can be independently performed using other segment in the video stream.

As a segment interpretation method, the segment interpretation unit 206 uses a method of searching for a start code indicating partitioning of the segment from the video stream, for example, thereby identifying the segment. Alternatively, the segment interpretation unit 206 may use a method of distinguishing partitioning of the segment based on the transmission format, for example, thereby identifying the segment in the video stream. Alternatively, the segment interpretation unit 206 may use a segment interpretation method specific to the video stream, thereby identifying the segment in the video stream.

A description will be directed below to a case where the video packet (VP) in the MPEG4 system is employed as the unit of the segment. A similar operation may be used also when other unit specific to the video encoding system (such as the GOB, slice, or NAL unit) is employed as the segment.

First, the segment interpretation unit 206 determines which segment (frame or video packet) is to be interpreted according to an initial value set in advance or the control instruction received from the instruction receiving unit 203. The relay apparatus 101 uses the segment interpreted by the segment interpretation unit 206 in this operation as the unit when the video stream is supplied to the video buffer 208 and the video stream in the video buffer 208 is discarded.

When the buffer control is performed for each frame, the number of video frames to be received by the receive terminal 103 is reduced, so that the frame rate is reduced. When the frame 30-3 shown in FIG. 3 is transmitted from the transmission terminal 102 by inter-frame prediction, for example, a reference frame becomes different if the immediately preceding frame 30-2 is discarded by the buffer control and is not transmitted to the receive terminal 103. For this reason, the frame to be referenced when the frame 30-3 is decoded becomes the frame 30-1, which is two frames before the frame 30-3, leading to image quality degradation of the image to be reproduced by the receive terminal 103. However, in case of a video with small motion (video where a change between frames is small), image quality degradation due to a shift of the reference frame is small. For this reason, in case of a video with the small motion, by exercising the buffer control for each frame, image quality degradation of the image to be reproduced by the receive terminal 103 can be reduced.

On the other hand, when the buffer control is exercised for each video packet VP, the frame rate of an image to be received by the receive terminal 103 is not changed. Video packets VP that could be received can be normally decoded. Even if the video packet VP31-2 shown in FIG. 3 has been discarded by the buffer control and has not been transmitted to the receive terminal 103, for example, other video packets VP31-1 and 31-3 to 31-m forming the frame 30-1 can be normally decoded. In this case, decode processing of the video packet VD31-2 in the frame depends on accuracy of a decoder in the receive terminal 103. For this reason, by exercising the buffer control for each video packet as the segment based on the accuracy of the decoder in the receive terminal 103, image quality degradation of the image to be reproduced by the receive terminal 103 can be reduced.

Next, a description will be directed to a case where the buffer control is exercised for each certain amount of bytes rather than for each segment. Assume that a portion in the vicinity of the end of the frame 30-1 and a portion in the vicinity of the head of the frame 30-2 have been discarded by the buffer control, for example. In this case, the receive terminal 103 can normally decode the frame 30-1 from the head portion thereof to a portion immediately preceding the discarded portion thereof. On the other hand, since the head portion of the frame 30-2 has been discarded (or a header portion, for example, has been discarded), the receive terminal 103 cannot normally perform decoding up to the next video packet VP or the next frame portion.

Likewise, also when a portion in the vicinity of the end of the video packet VP31-5 and a portion in the vicinity of the head of the video packet 31-6 have been discarded by the buffer control, the receive terminal 103 cannot normally perform decoding up to the next video packet VP or the next frame portion. When the buffer control is exercised for each certain amount of bytes rather than for each segment as described above, a large amount of data that has been received but cannot be normally decoded is transmitted to the receive terminal B103, thereby causing image quality degradation of the image to be reproduced by the receive terminal 103. In this exemplary embodiment, the video buffer control is exercised for each segment. Image quality degradation of an image to be reproduced by the receive terminal 103 can be thereby reduced.

The video buffer control unit 207 controls the video stream in the video buffer upon receipt of information from the instruction receiving unit 203, threshold setting unit 204, timing generation unit 205, and segment interpretation unit 206.

As described above, according to this exemplary embodiment, the relay apparatus 101 stores a video stream separated from receive data received from the transmit terminal 102 in the video buffer 208. Further, the relay apparatus 101 analyzes each segment included in the video stream and controls the amount of data of the video stream which is stored in the video buffer 208, for each segment, based on the result of segment analysis. The buffer control is exercised for each segment. Thus, when a part of the video stream to be originally transmitted by the relay apparatus 101 is discarded (reduced), image quality degradation at a time of video reproduction based on the video stream received by the receive terminal 103 can be reduced. Accordingly, when communication involving a video is performed, degradation of the video to be displayed on a receiving side due to the influence of transmission line conditions can be reduced.

According to this exemplary embodiment, the buffer control is performed for each segment. Thus, even when communication of a video stream is performed through networks having different transmission line conditions, degradation of a video to be displayed on a receiving side due to the influence of the transmission line conditions can be reduced, without transcoding encoded data.

Second Embodiment

Next, a second exemplary embodiment of the present invention will be described with reference to drawings. In this exemplary embodiment, a relay apparatus that uses a video buffer control method (buffer control method) includes means for identifying video stream information included in a video stream, in addition to components shown in the first exemplary embodiment.

Further, the relay apparatus includes means for using at least one of (1) a frame type, (2) a slice type, (3) a NAL unit type, (4) whether a NAL unit is a referenced or not, and (5) a macroblock type, as the video stream information. The relay apparatus further includes means for controlling a data amount using the identified video stream information, picks up the video stream from the video buffer, and transmits the extracted video stream to the terminal of a relay destination.

First, a configuration of a communication system using the buffer control method will be described with reference to the drawings. In this exemplary embodiment, a basic configuration of the communication system is the same as that shown in the first exemplary embodiment (refer to FIG. 1). In this exemplary embodiment, the function of a relay apparatus 401 is different from the function of the relay apparatus 101 shown in the first exemplary embodiment.

Figure 5:
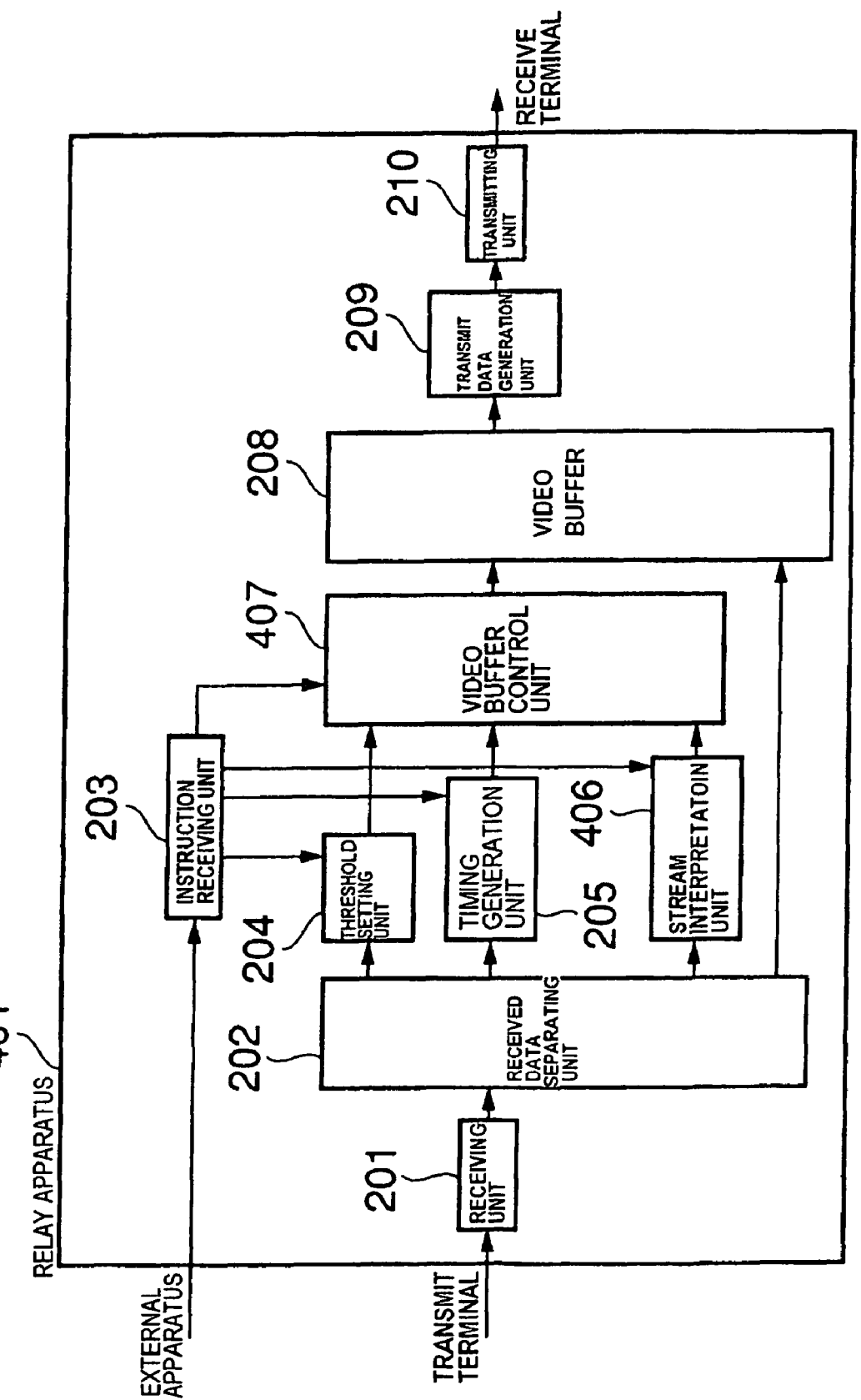
FIG. 5 is a block diagram showing other example of the configuration of the relay apparatus.

FIG. 5 is a block diagram showing other example of the relay apparatus. As shown in FIG. 5, the relay apparatus 401 in this exemplary embodiment is different from the first exemplary embodiment in that the relay apparatus 401 includes a stream interpretation unit 406 in place of the segment interpretation unit 206 of the relay apparatus 101 shown in FIG. 2. In this exemplary embodiment, the function of the video buffer control unit 407 is different from that of the video buffer control unit 207 shown in FIG. 2.

The relay apparatus 401 in this exemplary embodiment corresponds to the one to which means (that are the stream interpretation unit 406 and the video buffer control unit 407) for performing buffer control using the video stream information have been added to the relay apparatus 101 shown in the first exemplary embodiment. Incidentally, functions of the receiving unit 201, received data separating unit 202, instruction receiving unit 203, threshold setting unit 204, timing generation unit 205, video buffer 208, transmit data generation unit 209, and transmitting unit 210 are the same as those shown in the first exemplary embodiment.

The stream interpretation unit 406 includes a function of performing segment interpretation (segment analysis) and also obtaining (extracting) segment information from a video stream.

The video buffer control unit 407 includes a function of exercising control over the video buffer 208. In this case, like the video buffer control unit 207 shown in the first exemplary embodiment, the video buffer control unit 407 exercises control over the video buffer 208 based on a control instruction received from the external apparatus 104 by the instruction receiving unit 203. Like the video buffer control unit 207 shown in the first exemplary embodiment, the video buffer control unit 407 exercises control over the video buffer 208 based on a threshold set by the threshold setting unit 204. Like the video buffer control unit 207 shown in the first exemplary embodiment, the video buffer control unit 407 performs control over the video buffer 208, based on a timing set by the timing generation unit 205. The video buffer control unit 407 receives a segment interpreted by the stream interpretation unit 406 and the segment information extracted by the stream interpretation unit 406, thereby exercising buffer control of the video buffer control unit 207, in addition to the function of the video buffer control unit 207 shown in the first exemplary embodiment.

Figure 6:
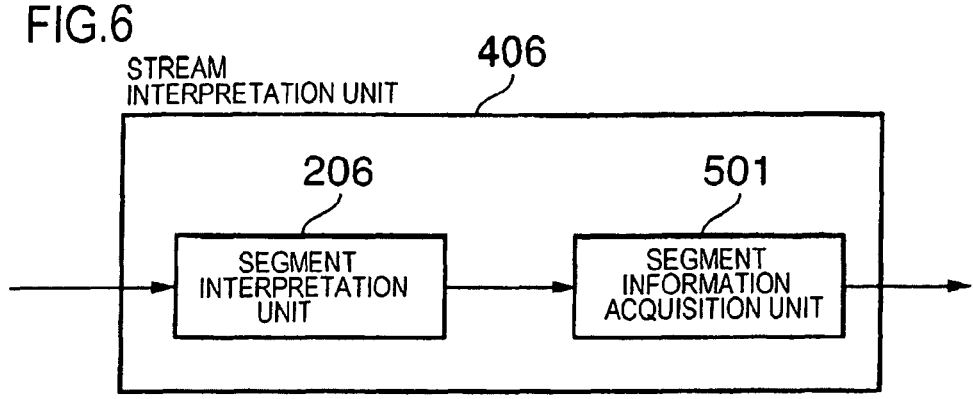
FIG. 6 is a block diagram showing an example of a configuration of a stream interpretation unit.

FIG. 6 is a block diagram showing an example of a configuration of the stream interpretation unit 406. As shown in FIG. 6, the stream interpretation unit 406 includes a segment interpretation unit 206 and a segment information acquisition unit 501. Like the segment interpretation unit 206 included in the relay apparatus 101 shown in the first exemplary embodiment, the segment interpretation unit 206 includes a function of interpreting (analyzing) a segment in a video stream. The segment information acquisition unit 501 includes a function of obtaining (extracting) information specific to the segment (segment information) from the segment (segment included in the video stream) interpreted by the segment interpretation unit 206.

Next, an operation will be described. In this exemplary embodiment, the relay apparatus 401 receives a video stream from a transmit terminal 102 and stores the received video stream in the video buffer 208, controls the video buffer 208, and transmits the video stream stored in the video buffer 208, according to processing that is similar to buffer control processing shown in FIG. 4.

When the segment interpretation unit 206 of the stream interpretation unit 406 receives the video stream from the received data separating unit 202, the segment interpretation unit 206 interprets each segment for each frame or for each unit specific to the video encoding system, obtained by dividing the frame, like the segment interpretation unit 206 shown in the first exemplary embodiment. The segment interpretation unit 206 sends (outputs) the interpreted segment to the segment information acquisition unit 501.

Based on an analysis result of the segment from the segment interpretation unit 206, the segment information acquisition unit 501 acquires (extracts) segment information. The segment information acquisition unit 501 outputs the obtained segment information to the video buffer control unit 407. Then, the video buffer control unit 407 uses the segment information received from the stream interpretation unit 406 for the buffer control.

First, a case where segment interpretation has been made for each frame will be considered. In this case, the segment information acquisition unit 501 analyzes the header portion of the stream at the head of the stream or analyzes the transmission format, thereby obtaining (extracting) a frame type as the segment information. Further, the video buffer control unit 407 controls the video buffer 208 using the frame type determined by the segment information acquisition unit 501. For this reason, a processing amount to be increased so as to determine the frame type can be reduced.

When the segment analysis is performed for each frame, the stream interpretation unit 406 determines a data priority in the buffer control according to the extracted frame type. Then, the video buffer control unit 407 controls the video buffer 208 according to priorities determined by the stream interpretation unit 406. The video buffer control unit 407 exercises control so that the video stream stored in the video buffer 208 is discarded for each segment in ascending order of the priorities, for example.

Figure 7:
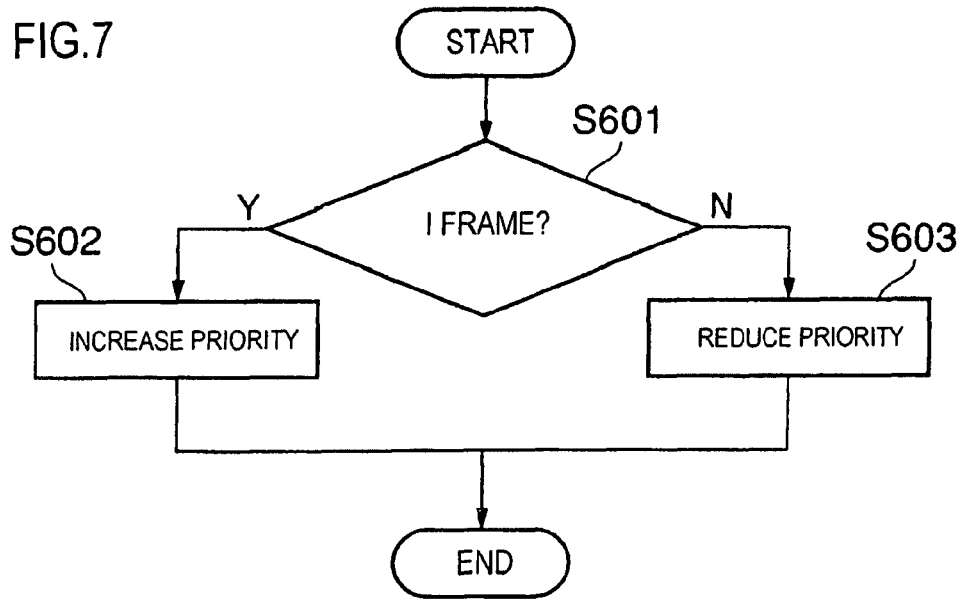
FIG. 7 is a flowchart showing an example of processing of determining a priority of data based on a frame type.

FIG. 7 is a flowchart showing an example of processing that determines the data priority based on the frame type. As shown in FIG. 7, the stream interpretation unit 406 first determines whether the type of a frame is an I frame or not based on the frame type extracted from the segment information acquisition unit 501 (in step S601). When the stream interpretation unit 406 determines that the frame type is the I frame, the stream interpretation unit 406 increases the priority of the frame because data in the frame can be decoded singly by inter-screen prediction (in step S602). That is, the stream interpretation unit 406 sets the priority of the I frame to be high.

When the stream interpretation unit 406 determines that the type of the frame is a frame (such as a B frame) other than the I frame, the stream interpretation unit 406 reduces the priority of the frame because the quality of a decoded video is dependent according to the condition of other frame in the inter-screen prediction (in step S603). That is, the stream interpretation unit 406 sets the priority of the frame other than the I frame to be low.

In a video stream such as "Simple Profile" in the MPEG4 system where only the I frames and P frames are present, for example, a P frame immediately preceding the I frame is not referenced by any picture. For this reason, even if the P frame immediately preceding the I frame is discarded, no disturbance will occur in an output video stream though the bit rate and the frame rate are reduced. Further, when the P frame immediately preceding the I frame is discarded, the P frame immediately preceding this discarded P frame will not also be referenced by any picture. For this reason, even if the P frame immediately preceding the discarded P frame is discarded, no disturbance will occur in the output video stream. In other words, setting the priorities so that the priority of the frame which is the farthest from a referenced frame (P frame immediately before the I frame) to be the lowest and then gradually increasing the priorities more toward the referenced frame may be conceived. When there is a frame not referenced by other frame, in addition to this P frame immediately preceding the I frame, the priority of the frame not referenced by other frame may be set to be significantly low. The B frame, for example, is not referenced by other frame. Thus, even if the B frame is discarded, no disturbance will occur in the output video stream. For this reason, setting the priority of the B frame to be significantly low may be conceived.

By execution of the processing described above, the stream interpretation unit 406 determines whether a frame is the one referenced by other frame or not, based on the frame type. Then, the video buffer control unit 407 controls the amount of data of the video stream which is stored in the video buffer 208, using a result of the determination. The stream interpretation unit 406 sets the priority of the frame according to the distance from a referenced frame. Then, the video buffer control unit 407 controls the amount of data of the video stream which is stored in the video buffer 208, using set priorities of frames.

When segment interpretation is performed for each slice in the H.264 system, the frame in FIG. 7 may be replaced by the slice. In this case, the segment information acquisition unit 501 determines and extracts the slice type of a slice in the video stream as segment information. Then, the video buffer control unit 407 controls the video buffer 208 using the slice type determined by the segment information acquisition unit 501.

Alternatively, the segment information acquisition unit 501 may determine the type of a macroblock included in the video stream as segment information. Then, the video buffer control unit 407 may control the video buffer 208 using the macroblock type determined by the segment information acquisition unit 501.

Next, a case where segment interpretation has been made for each NAL unit will be considered. In this case, the segment information acquisition unit 501 determines whether the NAL unit included in the video stream is a unit (reference picture) referenced by other NAL unit included in the video stream or not. Then, the video buffer control unit 407 controls the video buffer 208 using a result of determination as to whether the NAL unit is the reference picture or not.

The NAL unit includes a flag generally referred to as a NAL header indicating whether the NAL unit is the reference picture or not, and a header including an identifier indicating the type of the NAL unit. In this case, the stream interpretation unit 406 determines whether the segment (NAL unit) is the reference picture or not, using the flag indicating whether the segment is the reference picture included in the NAL unit or not, and determines the data priority in the buffer control.

Figure 8:
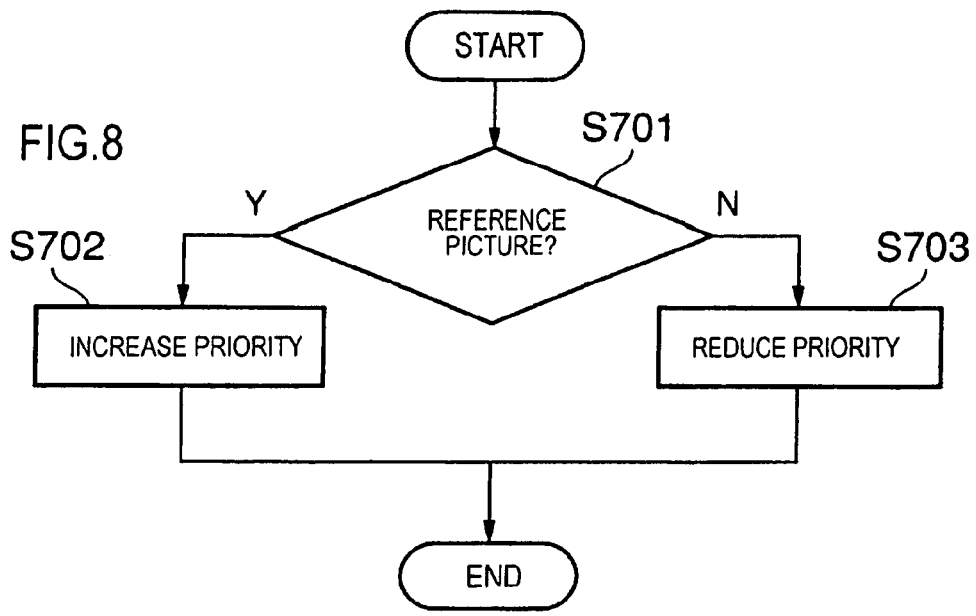
FIG. 8 is a flowchart showing an example of processing of determining a priority of data based on whether a segment is a reference picture or not.

FIG. 8 is a flowchart showing an example of processing of determining the data priority based on whether the segment is the reference picture or not. As shown in FIG. 8, the stream interpretation unit 406 first determines whether the segment is the reference picture or not (in step S701). When the stream interpretation unit 406 has determined that the segment is the reference picture, the stream interpretation unit 406 increases the priority of the segment because the segment is data referenced by other picture (in step S702). That is, the stream interpretation unit 406 sets the priority of the reference picture to be high.

Assume that the stream interpretation unit 406 has determined the segment not to be the reference picture in step S701. Then, the stream interpretation unit 406 reduces the priority of the segment (in step S703) because it can be seen that other picture will not be influenced even if the picture of the segment is lost (discarded). That is, the stream interpretation unit 406 sets the priority of the picture other than the reference picture to be low. When only a picture other than the reference picture is discarded, no disturbance will occur in the output video stream even if the bit rate and the frame rate are reduced.

Likewise, priorities used for the buffer control may be set by using the NAL unit type as well. In this case, the segment information acquisition unit 501 determines the type of a NAL unit included in a video stream. Then, the video buffer control unit 407 controls the video buffer 208 using the type of the NAL unit determined by the segment information acquisition unit 501.

When the type of the NAL unit indicates a sequence parameter set (SPS) or a picture parameter set (PPS), for example, these information will be the parameters necessary for subsequent video stream decoding. The stream interpretation unit 406 therefore sets the priority of the NAL unit to be the highest. When the type of the NAL unit indicates an AU delimiter, the AU delimiter represents an important value indicating a frame boundary. Thus, the stream interpretation unit 406 sets the priority of the NAL unit to be the second highest. When the type of the NAL unit indicates a slice of an IDR picture, the slice of the IDR picture indicates all states necessary for combining bit streams are reset, and highly affects subsequent decoding. Thus, the stream interpretation unit 406 sets the priority of the NAL unit to be the third highest. Then, when the type of the NAL unit is other than the types described above, the stream interpretation unit 406 sets the priority of the NAL unit to be lower.

Further, DecoderConfigInfo (DCI) information in the MPEG4 system, for example, which is not the NAL unit, is likewise a parameter necessary at a time of decoding of a video stream. Thus, the stream interpretation unit 406 may set the priority of the DecoderConfigInfo to be high. Assume that the transmission line 106 is a reliable, error-free transmission line. Then, when the stream interpretation unit 406 receives the same parameter as the immediately preceding SPS, PPS, or DCI, the stream interpretation unit 406 may set the priority of the received data to be lower.

Next, a case whether segment interpretation is performed for each VP (video packet) and one video packet VP is formed of one macroblock (MB) will be considered. In this case, by analyzing the head portion of the macroblock MB, the stream interpretation unit 406 can determine whether the macroblock is an IntraMB or not. Then, the stream interpretation unit 406 determines the data priority of the macroblock MB in the buffer control. Further, the stream interpretation unit 406 needs to interpret only the head portion of the macroblock MB. Accordingly, an increase in the amount of processing may be minimized.

Figure 9:
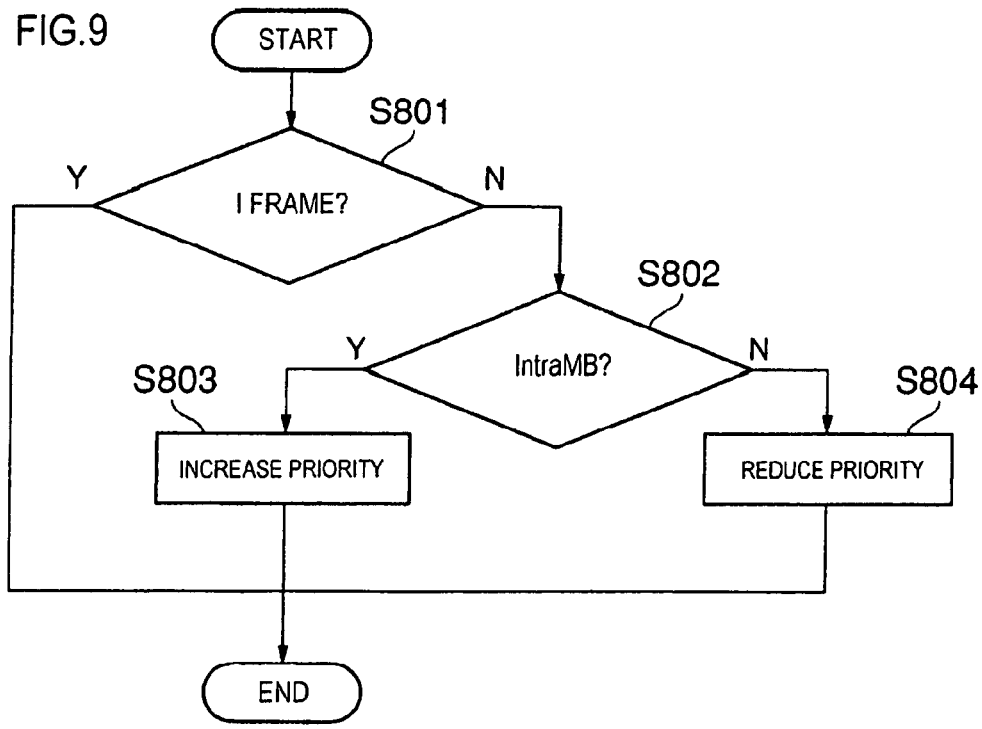
FIG. 9 is a flowchart showing an example of processing of determining a priority of data based on whether a segment is an IntraMB or not.

FIG. 9 is a flowchart showing an example of processing of determining the priority of data based on whether a segment is the IntraMB or not. As shown in FIG. 9, the stream interpretation unit 406 first determines whether the segment is the I frame or not (in step S801). When the stream interpretation unit 406 has determined that the segment belongs to the I frame, the stream interpretation unit 406 does not change the priority of the segment and finishes the processing without alteration because types of macroblocks in the frame are all the IntraMBs and there is no difference among segments in the frame.

When the stream interpretation unit 406 has determined that the segment does not belong to the I frame, the stream interpretation unit 406 determines whether the segment is the IntraMB or not (in step S802). Assume that the stream interpretation unit 406 has determined that the segment is the IntraMB. Then, the macroblock MB can be singly decoded when a video encoding system that does not perform inter-frame prediction using a frame other than the I frame is adopted. Thus, the stream interpretation unit 406 increases the priority of the segment (in step S803). That is, the stream interpretation unit 406 sets the priority of the segment of the IntraMB to be high.

When the stream interpretation unit 406 has determined that the segment is the MB other than the IntraMB, the stream interpretation unit 406 reduces the priority of the segment because the segment may be decoded using prediction based on other data (in step S804). That is, the stream interpretation unit 406 sets the priority of the segment of the MB other than the IntraMB to be lower.

Incidentally, referring to FIG. 9, the video packet VP may be replaced by other segment unit specific to the video encoding system, such as the GOB, slice, or NAL unit.

The ways of giving the priorities (methods of setting the priorities) shown in FIGS. 7 to 9 are examples. Even if the ways of giving the priorities is changed by the setting policy of a user, a similar effect can be obtained.

In the buffer control, the video buffer control unit 407 discards data (in a video stream) with a low priority among data in the video buffer 208 on segment-by-segment basis, or stops supply of the data with the low priority to the video buffer 208.

When the receive terminal 103 includes a buffer capable of absorbing some arrival order, the relay apparatus 401 may intentionally interchange a transmitting order of data with high priorities, for transmission. When a video encoding system is employed where to which sequence data belongs can be determined based on the PPS in a slice header and decoding can be performed without depending on the arrival order as in a case where the H.264 system is used, the relay apparatus 401 may intentionally interchange the transmission order of data with high priorities.

The present invention can be applied to a relay apparatus that relays communication of a video stream through different networks. The present invention can also be applied to a communication system including the relay apparatus that relays the communication through the different networks.

The invention claimed is:

1. A buffer control method of controlling a buffer included in a relay apparatus that relays a video stream from a transmit terminal to a receive terminal, the method comprising:
storing the video stream received from the transmit terminal in the buffer of the relay apparatus; and
controlling a data amount of the video stream stored in the buffer of the relay apparatus, for each segment, wherein as the control over the data amount in the buffer of the relay apparatus that stores the video stream received by the relay apparatus;
the data amount of the video stream in the buffer of the relay apparatus is controlled for the each segment, based on a combination of a result of interpretation of the each segment of the video stream received by the relay apparatus and other setting, the other setting including at least one of:
a threshold set for controlling the data amount in the buffer of the relay apparatus;
a predetermined timing set for controlling the data amount in the buffer of the relay apparatus; and
a control instruction supplied to the relay apparatus from an external apparatus connected to the relay apparatus;
the relay apparatus extracts the video stream stored in the buffer of the relay apparatus, and transmits the extracted video stream to the receive terminal;
the method further comprising:
where there is a packet loss or bit error, decoding a given segment of the video stream independently of another segment of the video stream;
determining as a determination result whether a given frame of the video stream is a reference frame reference from another frame of the video stream, based on a frame type; and
wherein controlling the data amount of the video stream stored in the buffer uses the determination result.

2. The buffer control method according to claim 1, wherein the control over the data amount in the buffer of the relay apparatus that stores up the video stream received by the relay apparatus further includes one of:
(S1) determining a frame type of a frame included in the video stream, the data amount of the video stream stored in the buffer of the relay apparatus being controlled using the frame type determined;
(S2) determining a slice type of a slice included in the video stream, the data amount of the video stream stored in the buffer of the relay apparatus being controlled using the slice type determined;
(S3) determining a type of a NAL (Network Abstraction Layer) unit included in the video stream, the data amount of the video stream stored in the buffer of the relay apparatus being controlled using the type of the NAL unit determined; and
(S4) determining a macroblock type of a macroblock included in the video stream, the data amount of the video stream stored in the buffer of the relay apparatus being controlled using the macroblock type determined.

3. The buffer control method according to claim 1, comprising:
a receive step of receiving the video stream transmitted from the transmit terminal;
the storage step storing the video stream received by the receiving step in the buffer;
an extraction step of extracting the video stream from the buffer; and
a transmission step of transmitting to a destination receive terminal the video stream extracted by the extraction step.

4. The buffer control method according to claim 1, wherein the buffer control step controls the data amount in the video stream stored in the buffer by performing at least one of:
a step of decimating a predetermined data amount of the video stream stored in the buffer;
a step of discarding the video stream stored in the buffer;
a step of stopping supply of the video stream to the buffer; and
a step of increasing an output rate of the video stream to be output from the buffer.

5. The buffer control method according to claim 1, comprising:
a threshold setting step of setting a threshold by a predetermined method,
the buffer control step controlling the data amount of the video stream stored in the buffer, based on the threshold set by the threshold setting step.

6. The buffer control method according to claim 1, wherein the buffer control step controls the data amount of the video stream stored in the buffer, according to a control instruction received from an external apparatus.

7. A relay apparatus that relays communication of a video stream, comprising:
a buffer in which a video stream is stored;
a storage control unit that stores a video stream received from a transmit terminal in the buffer;
a buffer control unit that controls a data amount of the video stream stored in the buffer for each segment; and
a segment interpretation unit that interprets the each segment of the video stream;
the relay apparatus further comprising at least one of:
a threshold setting unit that sets a threshold for control of the data amount of the buffer;
a timing generation unit that generates a predetermined timing for controlling the data amount of the buffer; and
an instruction receiving unit that receives a control instruction supplied to the relay apparatus from an external apparatus connected to the relay apparatus;
the buffer control unit controls the data amount of the video stream in the buffer for the each segment, based on one of:

(A) a result of interpretation of the each segment; and
(B) a combination of the result of interpretation of the each segment and other setting; and
the other setting of (B) includes at least one of:
the threshold;
the predetermined timing; and
the control instruction;
where there is a packet loss or bit error, decoding of a given segment of the video stream is performed independently of another segment of the video stream;
the relay apparatus further comprising a determination unit that determines as a determination result whether a given frame of the video stream is a reference frame reference from another frame of the video stream, based on a frame type; and
wherein the buffer control unit controls the data amount of the video stream stored in the buffer using the determination result.

8. The relay apparatus according to claim 7, comprising:
a receiving unit that receives the video stream transmitted from the transmit terminal;
an extraction unit that extracts the video stream from the buffer; and
a transmitting unit that transmits to a destination receive terminal the video stream extracted by the extraction unit;
the storage control unit storing the video stream received by the receiving unit in the buffer.

9. The relay apparatus according to claim 7, wherein
the buffer control unit controls the data amount in the video stream stored in the buffer by performing at least one of:
processing of decimating a predetermined data amount of the video stream stored in the buffer;
processing of discarding the video stream stored in the buffer;
processing of stopping supply of the video stream to the buffer; and
processing of increasing an output rate of the video stream to be output from the buffer.

10. The relay apparatus according to claim 7, wherein the buffer control unit controls the data amount of the video stream stored in the buffer by using, as the each segment, at least one of:
a frame;
a video packet;
a GOB (Group Of Blocks);
a slice; and
a NAL (Network Abstraction Layer) unit.

11. The relay apparatus according to claim 7, comprising:
a threshold setting unit that sets a threshold by a predetermined method,
the buffer control unit controlling the data amount of the video stream stored in the buffer, based on the threshold set by the threshold setting unit.

12. The relay apparatus according to claim 11, wherein
the buffer control unit controls the data amount of the video stream stored in the buffer by using at least one control of:
(A) control of setting an upper limit value of the data amount of the video stream as the threshold and stopping supply of the video stream to the buffer, discarding at least a portion of the video stream in the buffer, or increasing an output bit rate of the video stream from the buffer, if the data amount of the video stream stored up in the buffer has reached the upper limit value or higher;
(B) control of setting the upper limit value and a lower limit value of the data amount of the video stream as the thresholds, and stopping supply of the video stream to the buffer or increasing the output bit rate of the video stream from the buffer until the data amount of the video stream in the buffer reaches the lower limit value, if the data amount of the video stream stored up in the buffer has reached the upper limit value or higher; and
(C) control of setting a decimation threshold for decimating the data amount of the video stream as the threshold and not supplying a predetermined data amount of data to the buffer, if the data amount of the video stream in the buffer has reached the decimation threshold.

13. The relay apparatus according to claim 12, wherein
the buffer control unit controls the data amount of the video stream stored in the buffer based on a predetermined timing; and
the predetermined timing comprises at least one of:
a timing of each certain time;
a timing when a number of received packets has reached a certain amount;
a timing when a data amount of the received video stream has reached a certain amount;
a timing when a data amount supplied to the buffer has reached a certain amount; and
a timing when a number of segments of the received video stream has reached a certain amount.

14. The relay apparatus according to claim 7, wherein
the buffer control unit controls the data amount of the video stream stored in the buffer, according to a control instruction received from an external apparatus.

15. The relay apparatus according to claim 7, comprising at least one determination unit of:
a frame type determination unit that determines a frame type of a frame included in the video stream;
a slice type determination unit that determines a slice type of a slice included in the video stream;
a type determination unit that determines a type of a NAL unit included in the video stream; and
a macroblock type determination unit that determines a macroblock type of a macroblock included in the video stream;
the buffer control unit controlling the data amount of the video stream stored in the buffer using at least one of:
the frame type;
the slice type;
the NAL unit type; and
the macroblock type.

16. The relay apparatus according to claim 7, comprising:
a frame type determination unit that determines a frame type of a frame included in the video stream; and
a referenced/unreferenced determination unit that determines whether the frame is a referenced frame referenced from other frame or not, based on the frame type;
the buffer control unit controlling the data amount of the video stream stored in the buffer, using a result of determination by the referenced/unreferenced determination unit as to whether the frame is the referenced frame or not.

17. The relay apparatus according to claim 16, comprising:
a priority setting unit that sets a priority of the frame according to a distance from the referenced frame,
the buffer control unit controlling the data amount of the video stream stored in the buffer of the relay apparatus, using the priority of the frame, as buffer control using the frame type.

18. The relay apparatus according to claim 7, comprising:
a type determination unit that determines a type of a NAL unit included in the video stream; and a referenced/unreferenced determination unit that determines whether the NAL unit is a referenced unit referenced by other NAL unit included in the video stream;

the buffer control unit controlling the data amount of the video stream stored in the buffer, using a result of determination by the referenced/unreferenced determination unit as to whether the NAL unit is the referenced unit or not.

19. A communication system that includes a transmit terminal, a relay apparatus, and a receive terminal, the relay apparatus relaying a video stream from the transmit terminal and transmitting the relayed video stream to the receive terminal, wherein the relay apparatus comprises:

a buffer that stores therein the video stream received from the transmit terminal;

a buffer control unit that controls a data amount of the video stream stored in the buffer for each segment; and a unit that extracts the video stream stored up in the buffer and transmits the extracted video stream to the receive terminal, wherein the relay apparatus further comprises:

a segment interpretation unit that interprets the each segment of the video stream;

the relay apparatus further comprises at least one of:

a threshold setting unit that sets a threshold for control of the data amount of the buffer;

a timing generation unit that generates a predetermined timing for controlling the data amount of the buffer; and an instruction receiving unit that receives a control instruction supplied to the relay apparatus from an external apparatus connected to the relay apparatus;

the buffer control unit controls the data amount of the video stream in the buffer for the each segment, based on one of:

(A) a result of interpretation of the each segment; and (B) a combination of the result of interpretation of the each segment and other setting; and the other setting of (B) includes at least one of:

the threshold;

the predetermined timing; and the control instruction;

where there is a packet loss or bit error, decoding of a given segment of the video stream is performed independently of another segment of the video stream;

the relay apparatus further comprising a determination unit that determines as a determination result whether a given frame of the video stream is a reference frame reference from another frame of the video stream, based on a frame type; and wherein the buffer control unit controls the data amount of the video stream stored in the buffer using the determination result.

20. The communication system according to claim 19, wherein the relay apparatus comprises:

a stream interpretation unit that performs segment interpretation of the video stream and extracts segment information from the video stream, the stream interpretation unit in the relay apparatus performing one of control of:

(S1) determining a frame type of a frame included in the video stream, the buffer control unit controlling the data amount of the video stream stored in the buffer using the determined frame type;

(S2) determining a slice type of a slice included in the video stream, the buffer control unit controlling the data amount of the video stream stored in the buffer using the determined slice type;

(S3) determining a type of a NAL (Network Absraction Layer) unit included in the video stream, the buffer control unit controlling the data amount of the video stream stored in the buffer using the determined NAL unit type; and (S4) determining a macroblock type of a macroblock included in the video stream, the buffer control unit controlling the data amount of the video stream stored in the buffer using the determined macroblock type.

21. The communication system according to claim 20, wherein as the control of (S1), the stream interpretation unit determines whether the frame is a referenced frame referenced from other frame or not, based on the type of the frame included in the video stream, and the buffer control unit controls the data amount of the video stream stored in the buffer using a result of determination by the referenced/unreferenced determination unit as to whether the frame is the referenced frame or not, as buffer control using the frame type; and as the control of (S3), the stream interpretation unit determines whether the NAL unit included in the video stream is a referenced unit referenced by other NAL unit included in the video stream or not, and the buffer control unit controls the data amount of the video stream stored in the buffer, using a result of determination by the referenced/unreferenced determination unit as to whether the NAL unit is the referenced unit or not.

22. The communication system according to claim 20, wherein in the relay apparatus, as the control of (S1), the stream interpretation unit comprises a unit that sets a priority of the frame according to a distance from the referenced frame; and the buffer control unit controls the data amount of the video stream stored in the buffer of the relay apparatus using the priority of the frame, as buffer control using the frame type.

* * * * *